Feb. 21, 1967   E. J. KUJAN   3,304,967
SAW GUIDE
Filed April 28, 1965

INVENTOR.
EDWARD J. KUJAN
BY
Charles L. Lovercheck
attorney

United States Patent Office 3,304,967
Patented Feb. 21, 1967

3,304,967
SAW GUIDE
Edward J. Kujan, 914 Sill Ave., Erie, Pa. 16505
Filed Apr. 28, 1965, Ser. No. 451,456
3 Claims. (Cl. 143—6)

This invention relates to power tools and, more particularly, to saw guides for guiding power saws.

Numerous saw guides have been proposed, but in each case, they have been complex and expensive to manufacture.

It is, accordingly, an object of the invention to provide an improved saw guide.

Another object of the invention is to provide a saw guide, which is simple in construction, economical to manufacture, and simple and efficient to use.

Another object of the invention is to provide a saw guide that has a minimum number of parts and is completely universal and compact.

Another object of the invention is to provide an improved saw guide in combination with a saw.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
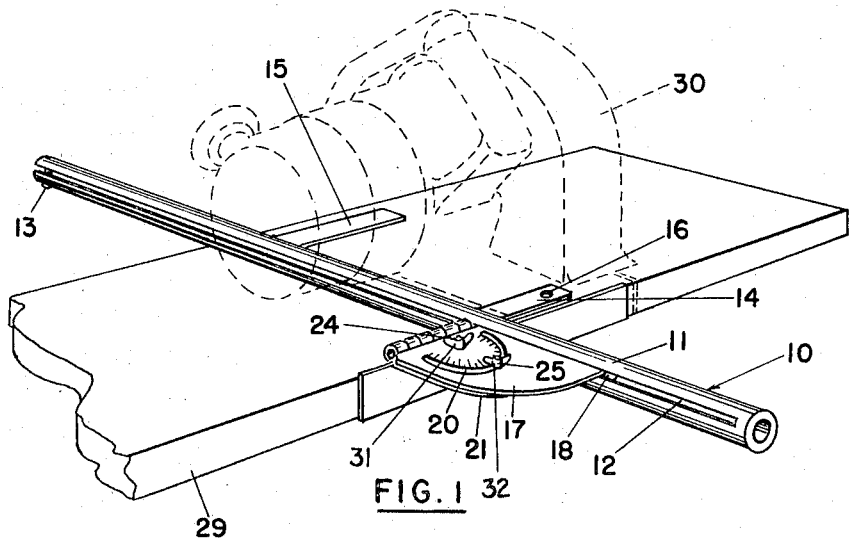
FIG. 1 is an isometric view of a saw guide with saw shown attached thereto by dotted lines.
Figure 2:
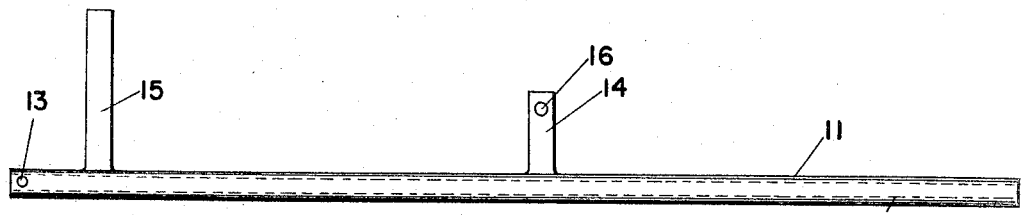
FIG. 2 is a top view of the tubular track and attaching arms.
Figures 3, 4:
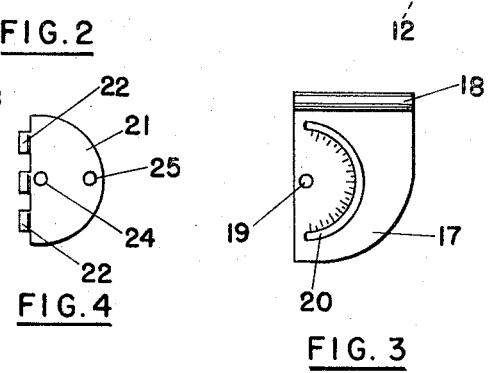
FIG. 3 is a top view of the sliding protractor attached to the follower member.
FIG. 4 is a view of the hinge member.
Figures 5, 6:
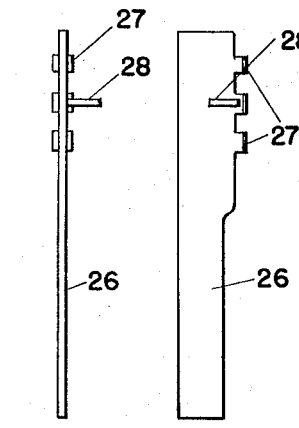
FIG. 5 is a bottom view of the guide arm.
FIG. 6 is a side view of the guide arm of the invention.

Now with more particular reference to the drawing, the saw guide is indicated generally at 10. It is shown supported on a board 29. The saw 30 is shown in dotted lines, which may be attached to the attaching arms 14 and 15 by suitable bolts received in the hole 16.

The track 11 is made of a tubular member and has a slot 12 extending longitudinally from one end to the other. The slot is closed at one end and has a stop 13 extending through the opposite end to limit the travel of the follower member 18. The follower member 18 is integrally attached to the protractor plate 17.

The protractor plate 17 is supported on top of the hinge protractor plate 21 and they are held together by means of the bolts 24 and 25 which are welded to plate 21 and received in the hole 19 and slot 20, and they are clamped by means of the thumb nuts 31 and 32 shown. The second bolt is indicated at 25 and it extends through hole 19 in the hinge protractor plate 21 and up through the arcuate slot 20 and has a thumb nut 32 attached thereto to clamp the plates 17 and 21 together. The guide plate 26 is an elongated member having the hinge 27 on one side, and this hinge cooperates with the hinge member 22 on the hinge protractor plate 21 and swingably attaches the guide plate 26 to the hinge protractor plate 21. A stop 28 is integrally attached to the guide plate 26 and this stop limits the swinging movement of the guide plate 26.

It will be seen that when the saw guide is supported on a board such as 29 or other member to be cut by the saw with the guide plate 26 against one edge of the board that the saw will slide along the follower member 11 carrying the track along with it, thus guiding the saw in a straight line.

If it is desired to cut the board at a predetermined angle, the thumb nuts 31 and 32 are loosened and the track is pivoted to the desired position, and the thumb nuts are then tightened. The saw will then be guided at the angle to which the protractor is set. The guide plate when swung to 90 degrees will act as a rip guide.

By sliding the guide plate 26 to the extreme end of the tube, the guide plate 26 can be swung over the top of the tubular track in order to get it out of the way for ripping a board or other member.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A saw guide comprising
a tubular track section,
follower means slidably received in said tubular track section,
means for attaching a saw to said tubular track section,
and means attached to said track section to engage a member to be sawed,
said means attached to said track section being attached thereto by means of a protractor,
said protractor having two relatively movable parts whereby said means may be adjusted relative to said track section.

2. In combination, a saw and a guide comprising
a tubular track having a longitudinal slot in one side thereof extending from one end to the other,
means attaching said saw to said tubular track,
a generally cylindrical follower received in said tubular track,
a guide plate,
and means extending into said slot attaching said guide plate to said follower,
said guide plate being hinged to said follower to swing about an axis generally perpendicular to said tubular track whereby said guide plate can be swung up over the top of said tubular track.

3. In combination, a saw and a guide comprising
a tubular track having a longitudinal slot in one side thereof extending from one end to the other,
means attaching said saw to said tubular track,
a generally cylindrical follower received in said tubular track,
a guide plate,
means extending into said slot attaching said guide plate to said follower,
said guide plate being hinged to said follower to swing about an axis generally perpendicular to said tubular track whereby said guide plate can be swung up over the top of said tubular track, said means attaching said guide plate to said follower comprising a first pivot plate attached to said follower, a second plate hinged to said guide plate, said first and second plates being disposed in side by side relation, and pivot means rotatably securing said first and second plates together.

References Cited by the Examiner

UNITED STATES PATENTS

| 2,876,808 | 3/1959 | Lindheim | 143—6 |
| 2,942,633 | 6/1960 | King | 143—6 |

WILLIAM W. DYER, JR., *Primary Examiner.*

W. D. BRAY, *Examiner.*